Oct. 10, 1939.  C. W. JEREMIAH  2,175,776
JACKING ATTACHMENT
Filed March 7, 1938  2 Sheets-Sheet 1
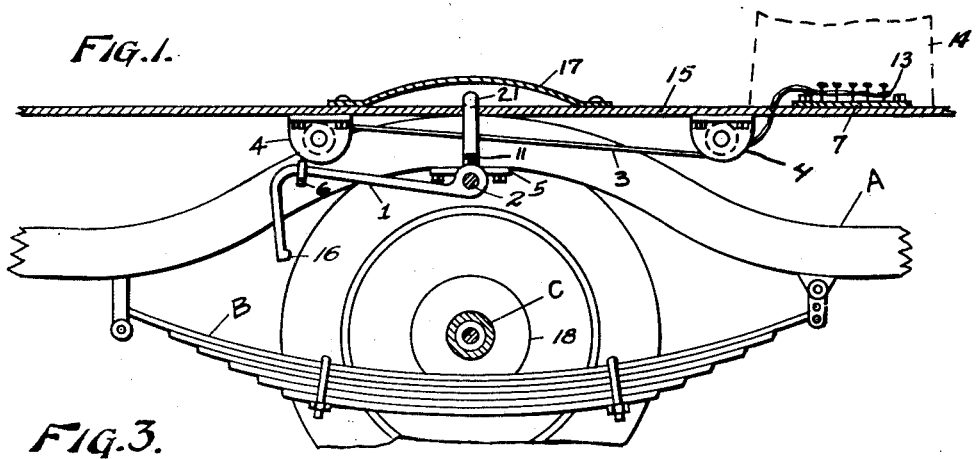
FIG. 1.
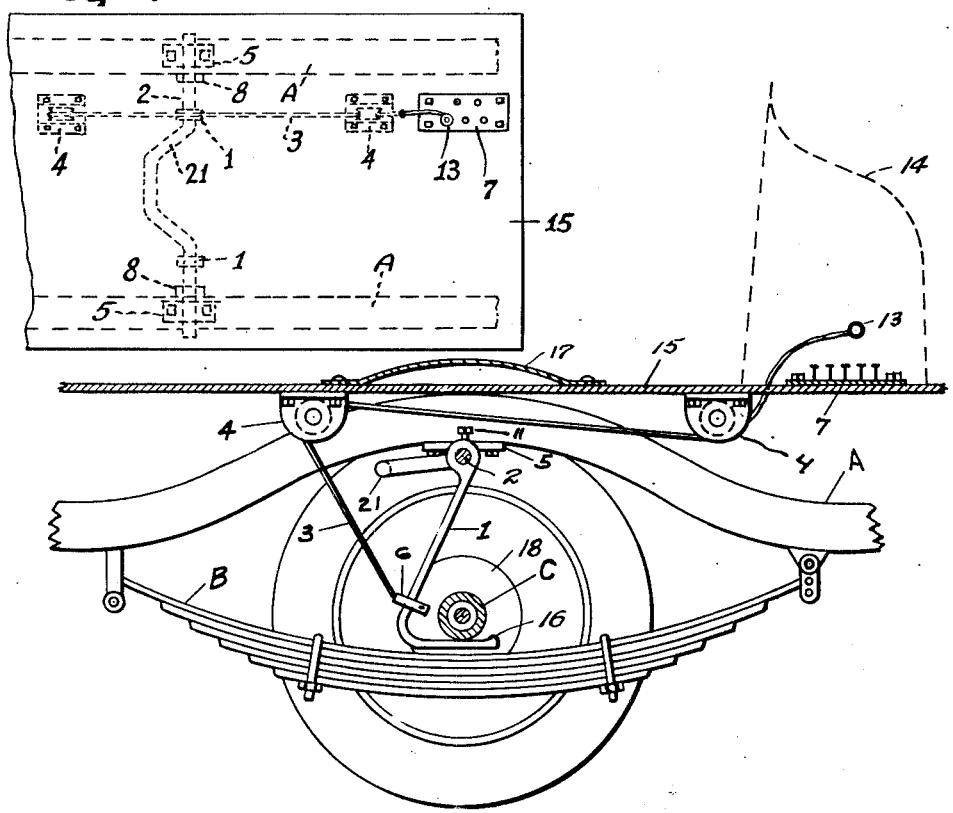
FIG. 3.
FIG. 2
Charles W. Jeremiah
INVENTOR
BY Frank Zugelter
ATTORNEY Oct. 10, 1939.　　　C. W. JEREMIAH　　　2,175,776
JACKING ATTACHMENT
Filed March 7, 1938　　　2 Sheets-Sheet 2

PLAN VIEW

REAR VIEW

Charles W. Jeremiah
INVENTOR

BY Frank Zugelter
ATTORNEY

Patented Oct. 10, 1939

2,175,776

UNITED STATES PATENT OFFICE 2,175,776

JACKING ATTACHMENT

Charles W. Jeremiah, Cincinnati, Ohio

Application March 7, 1938, Serial No. 194,278

4 Claims. (Cl. 254—150)

This invention relates to an attachment for vehicles having spring mounted wheels, to facilitate and expedite jacking up the vehicle and lifting the wheels clear of the roadway, when necessary.

An object of the invention is to provide a jacking attachment characterized by its extreme simplicity and the absence of numerous moving parts, to the end that the cost of manufacture and maintenance of the device is reduced to a practical minimum.

Another object of the invention is to provide device of the kind referred to above, in such man- readily be operated by persons not familiar with mechanical intricacies, and which will require no servicing in order to maintain it in an operable condition.

A further object is to construct a simplified device of the kind refered to above, in such manner as to avoid the probability of annoyance due to vibration and rattling of any parts of the device, as well as the inconvenience of having moving parts to gum up and thereby disable the mechanism at a time when it is needed most.

These and other objects are attained by the means described herein and disclosed in the accompanying drawings, in which:

Fig. 1 is a central longitudinal sectional view of a vehicle chassis, showing the jacking attachment of the invention in the normal or inoperative position.

Fig. 2 is a view similar to Fig. 1, showing the jacking attachment in the operative position.

Fig. 3 is a plan view of the Fig. 2 structure, as viewed from above.

Figure 4:
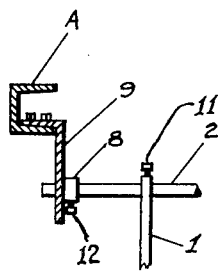
Figs. 4, 5 and 6 are detail views showing alternative methods of attaching the device of the invention to a vehicle frame.

As is commonly known, automotive vehicles of recent design are built in such a manner that it is difficult and inconvenient to place a jack or lifting device at locations of advantage for performance of the lifting operation. Special jacks having a wide lifting range have been provided, to engage the bumpers or other accessible parts of the vehicle and thereby render unnecessary the placing of the jack beneath the axles or other relatively inaccessible portions of the running gear; but with the use of such special jacks in the manner intended, considerable added time and effort is necessary for lifting a wheel clear of the roadway, due to the fact that the wheel cannot be elevated until the vehicle springs have been first relieved of strain. In other words, when the chassis is lifted up, the springs bow downwardly due to the hanging weight of the wheels and axles supported thereon. Accordingly, a great deal of lifting is required, over and above the range of movement that would actually be necessary for elevating the wheels from the roadway.

It is appreciated that various solutions to the problem of easily jacking up the wheels have been proposed but the fact that none of them apparently has been generally accepted in the industry gives rise to the question of their practicability. Such devices should be constructed so as to require no servicing, and they should be so simple that no difficulty may be encountered in their use by persons unskilled in the mechanical arts, for all types of persons own and operate automotive vehicles. Moreover, the design of any device to facilitate the lifting operation must be such as to promote safety, and a structure that may become loose and noisy would necessarily be considered unsatisfactory from a practical standpoint. The use of springs and a multiplicity of parts in a jacking attachment is conducive to vibration and noise, and should therefore be avoided. With these observations foremost in mind, the description proceeds, to disclose an improved structure free of the various objectionable features noted above.

With reference to the accompanying drawings the characters A, B and C indicate, respectively, the frame, the spring, and the axle of an automotive vehicle. The spring is attached to the frame and to the axle in the customary manner, wherefore an explanation of details in that regard should be unnecessary.

In accordance with the invention, a pair of hooks or restraining elements is provided and arranged to be swung from the normal inoperative position of Fig. 1 to the operative position of Fig. 2, so as to engage beneath the axle housing, as indicated in Fig. 2. A transverse shaft or rod 2, which is suitably pivoted for rotational movement upon the frame A, furnishes a support for the pair of hooks or restraining element I, and any suitable means, such as set-screws II, may be employed for fixing the parts for unitary movement.

A flexible cord or cable 3 passing over a pair of pulleys indicated at 4, and secured to one of the hooks or restraining elements as at 6, serves to elevate the hooks or restraining elements and maintain them in the inoperative position of Fig. 1. The free end of the cord or cable may be provided with a ring or equivalent anchoring device 13 adapted to cooperate with a series of pegs or pins 7. To hold the element 1 in the inoperative position, the flexible cord or cable may be entwined about the pegs or pins 7, after which the ring 13 may be disposed about one of the pegs or pins to securely fasten the free end of the cord or cable. At this point in the description it should be noted that the off-set portion 21 of the shaft 2, being disposed substantially at right angles to the hooks 1, aids the gravitation of the hooks toward the operative position of Fig. 2 when the cord or cable is released. The off-set portion 21, in the inoperative position of Fig. 1, serves also to permit unlimited movement of the rear axle differential housing in an upward direction when the vehicle is in service. In Figs. 1, 2, 6, 7, and 8, the characters 5 indicate suitable bearings for the ends of the shaft 2, which bearings are by preference bolted or otherwise fixed to the frame of the vehicle, or to the body thereof. In the modification illustrated by Figs. 4 and 5, the conventional bearings are replaced by brackets, such as 9 and 10, designed and constructed to meet the requirements of the chassis of the vehicle. In each drawing view, the character 8 indicates a collar which is fixed to the shaft or rod 2 so as to preclude end-wise movement of the shaft. Set-screws 12 or other suitable means may be employed for fixing the collars in position.

The reference character 14 indicates the trunk or rear compartment of the vehicle, wherein the group of pegs or pins preferably is located. The group of pegs or pins may be mounted upon the floor 15 of the vehicle body. A nub or abutment 16 may be applied to the free end of each hook or restraining member 1, to avoid possible accidental displacement of the axle housing from its position upon the hooks. The curved plate 17 provides a recess in the vehicle floor, to permit upward movement of the axle differential 18 under the action of the springs, as is customary.

Figure 5:
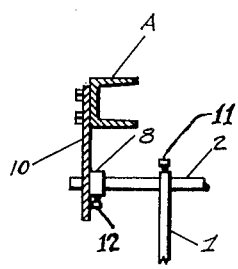
Figure 6:
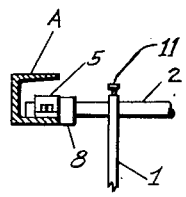
Figure 7:
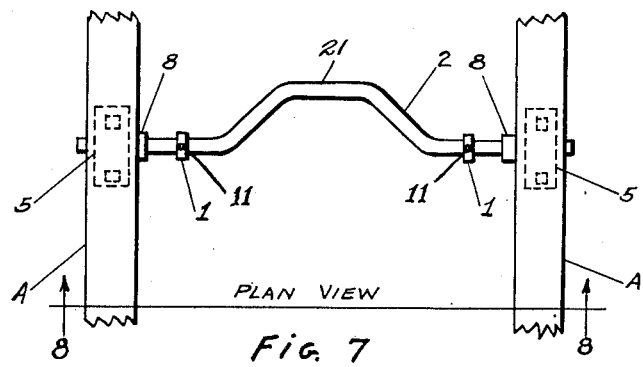
Fig. 7 is a fragmental plan view of a vehicle frame, showing the relationship of parts of the device, the vehicle axle being omitted from the illustration.
Figure 8:
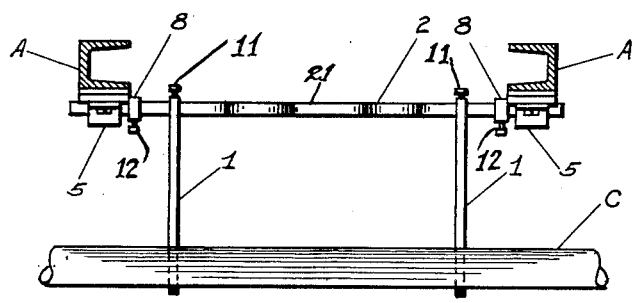
Fig. 8 is a cross-sectional view taken on line 8—8 of Fig. 7, and showing the location of the axle relative to the attachment herein disclosed.

Figs. 4, 5, 6, and 8 show several different ways to support the transverse shaft or rod 2. In Fig. 4, the support 9 is in the form of an angle bracket, whereas in Fig. 5 it is of flat plate design. In Fig. 6, the bearing 5 is secured within the limits of the frame channel, whereas in Fig. 8 the bearing is mounted upon the lower leg of the channel, exteriorly thereof.

In conclusion, it should be noted that there is but one moving part in the entire structure that could possibly vibrate or rattle, this being the composite unit 1—1——8—6, but looseness or rattling cannot possibly occur if the flexible cable be drawn taut and securely fastened to the pegs. Devices of this general character which employ pivoted latches, dogs, springs and links cannot be kept tightened after several thousand miles of travel, due to the abrasion of relatively movable parts contacting each other in the presence of dust and grit from the road, which rapidly wears the connections to looseness. Moreover, it will be readily evident that no small parts are employed which might fail to move and function in the presence of heavy road oil and mud that might collect thereon over a period of time.

It is to be understood that various modifications and changes in the structure of the device may be made, within the scope of the appended claims, without departing from the spirit of the invention.

What is claimed is:

1. In a jacking attachment for vehicles having a frame and a body, an axle housing, and a spring mounted upon the frame to resiliently support the axle housing, the combination of a shaft spanning the vehicle frame and having an integral off-set middle portion, means on the frame supporting the shaft for rocking movement directly above the axle housing and transversely of the frame, a pair of axle housing restraining hooks each fixed to the shaft in spaced parallelism and substantially at right angles to the off-set portion of the shaft, so that the weight of the off-set portion of the shaft will influence the rocking movement of the shaft when the shaft rotates to position for disposing the hooks beneath the axle housing, and means for rotating the shaft and its associated hooks to a normally inoperative position at which the hooks are displaced from the housing holding position, said means comprising a pulley stationarily supported relative to the vehicle body and in alignment with the restraining hooks, a flexible cable passing over the pulley and having opposite ends, one of which ends is fixed to a restraining hook, and means within the body to anchor the opposite end of the cable when the cable is drawn taut to force one of the hooks against and in binding relationship with said pulley, in an elevated inoperative position remote from the axle housing.

2. In a device of the class described for attachment to a vehicle having a frame and a body, an axle housing, and a spring mounted upon the frame to resiliently support the axle housing, said device comprising in combination a shaft and means on the frame supporting the shaft for rocking movement transversely of the frame and above the axle housing, a pair of restraining elements each having an end fixed to the rocking shaft and an opposite end developed into a hook formation to hook under the axle housing upon rocking of the shaft in one direction of rotation, a flexible cable having one end secured to a restraining element near its hooked end, a pulley in the line of travel of the restraining element and supporting the cable in position to lift the hooked end of the restraining element from hooking relationship with the axle housing, and to a position of contact against the pulley to prevent rattle when the hooked end is lifted, and a series of pegs fixed relative to the vehicle body and upon which the opposite end of the flexible cable is to be anchored while holding the restraining elements in binding contact against the pulley, said pegs being at different distances from said pulley to compensate for wear and stretch of the cable in anchoring same.

3. In a jacking attachment for vehicles having a frame and a body, an axle housing, and a spring mounted upon the frame to resiliently support the axle housing, the combination of a shaft spanning the vehicle frame and having an integral off-set middle portion, means on the frame supporting the shaft for rocking movement directly above the axle housing and transversely of the frame, a pair of axle housing restraining hooks fixed to the shaft in spaced parallelism and substantially at right angles to the off-set portion of the shaft, so that the weight of the off-set portion of the shaft will influence the rocking movement of the shaft when the shaft rotates to position for disposing the hooks beneath the axle housing, and means for rotating the shaft and its associated hooks to a normally inoperative position at which the hooks are displaced from the housing holding position and the off-set portion of the rock shaft extends upwardly in a substantially vertical plane above the axle housing.

4. In a jacking attachment for vehicles having a frame and a body, an axle housing, and a spring mounted upon the frame to resiliently support the axle housing, the combination of a shaft spanning the vehicle frame and having an integral off-set middle portion, means on the frame supporting the shaft for rocking movement directly above the axle housing and transversely of the frame, a pair of axle housing restraining hooks fixed to the shaft in spaced parallelism and substantially at right angles to the off-set portion of the shaft, so that the weight of the off-set portion of the shaft will influence the rocking movement of the shaft when the shaft rotates to position for disposing the hooks beneath the axle housing, and means for rotating the shaft and its associated hooks to a normally inoperative position at which the hooks are displaced from the housing holding position and the off-set portion of the rock shaft extends upwardly in a substantially vertical plane above the axle housing, said means comprising a flexible cable having one end secured to a restraining element near its hooked end, a pulley in the line of travel of the restraining element and supporting the cable in position to lift the hooked end of the restraining element from hooking relationship with the axle housing, and to a position of contact against the pulley to prevent rattle when the hooked end is lifted, and a series of pegs fixed relative to the vehicle body and upon which the opposite end of the flexible cable is to be anchored while holding the restraining elements in binding contact against the pulley, said pegs being at different distances from said pulley to compensate for wear and stretch of the cable in anchoring same.

CHARLES W. JEREMIAH.